(12) United States Patent
Kaushal

(10) Patent No.: US 7,874,833 B2
(45) Date of Patent: Jan. 25, 2011

(54) INJECTION MOLDING RUNNER APPARATUS HAVING PRESSURE SEAL

(75) Inventor: Hitesh Kaushal, Brampton (CA)

(73) Assignee: Mold-Masters (2007) Limited, Georgetown, Ontario (CA)

(*) Notice: Subject to any disclaimer, the term of this patent is extended or adjusted under 35 U.S.C. 154(b) by 89 days.

(21) Appl. No.: 12/434,684

(22) Filed: May 3, 2009

(65) Prior Publication Data

US 2010/0278962 A1 Nov. 4, 2010

(51) Int. Cl.
B29C 45/20 (2006.01)
(52) U.S. Cl. ...................... 425/549; 425/572
(58) Field of Classification Search ............. 425/549, 425/562, 563, 564, 565, 566, 572
See application file for complete search history.

(56) References Cited

U.S. PATENT DOCUMENTS

| | | | |
|---|---|---|---|
| 2,301,097 A | 11/1942 | Tweedale |
| 2,933,334 A | 4/1960 | De Moude |
| 3,078,100 A | 2/1963 | Starr |
| 3,302,953 A | 2/1967 | Glasgow |
| 3,339,950 A | 9/1967 | Grove |
| 3,553,788 A | 1/1971 | Putkowski |
| 3,561,793 A | 2/1971 | Rode |
| 3,812,228 A | 5/1974 | Skoroszewski |
| 3,822,856 A | 7/1974 | Gellert |
| 4,013,393 A | 3/1977 | Gellert |
| 4,026,518 A | 5/1977 | Gellert |
| 4,053,271 A | 10/1977 | Gellert |
| 4,231,578 A | 11/1980 | Traub |
| 4,333,629 A | 6/1982 | Roy |
| 4,422,841 A | 12/1983 | Alfonsi et al. |
| 4,468,191 A | 8/1984 | Gellert |
| 4,662,837 A | 5/1987 | Anderson |
| 5,147,663 A | 9/1992 | Trakas |
| 5,176,409 A | 1/1993 | Brooks |
| 5,227,179 A | 7/1993 | Benenati |
| 5,387,099 A | 2/1995 | Gellert |
| 5,499,916 A | 3/1996 | Schad et al. |
| 5,518,389 A | 5/1996 | Nonomura et al. |

(Continued)

FOREIGN PATENT DOCUMENTS

CA 2047461 A1 1/1993

(Continued)

OTHER PUBLICATIONS

"Metal O Ring Sealing System for Runner Molds", *Incoe Brochure* Jan. 1995.

(Continued)

*Primary Examiner*—Tim Heitbrink
(74) *Attorney, Agent, or Firm*—Medler Ferro PLLC

(57) ABSTRACT

An upstream runner component defines an upstream channel for flow of molding material. A downstream runner component defines a downstream channel for flow of molding material. A wedge seal is disposed in a converging gap defined surface of the upstream runner component and the downstream runner component. The wedge seal defines a seal channel connecting the upstream channel to the downstream channel. Pressure of molding material acting on an inside surface of the wedge seal defining the seal channel pushes the wedge seal into sealing contact with the surfaces of the upstream runner component and the downstream runner component defining the converging gap.

19 Claims, 4 Drawing Sheets

U.S. PATENT DOCUMENTS

| | | | |
|---|---|---|---|
| 5,609,893 | A | 3/1997 | Eastwood |
| 5,759,595 | A | 6/1998 | Gunther |
| 5,792,493 | A | 8/1998 | Gellert |
| 5,820,899 | A | 10/1998 | Gellert et al. |
| 5,896,640 | A | 4/1999 | Lazinski et al. |
| 6,007,108 | A | 12/1999 | Braun |
| 6,261,084 | B1 | 7/2001 | Scmidt |
| 6,561,790 | B2 | 5/2003 | Blais et al. |
| 6,712,597 | B1 | 3/2004 | Van Boekel |
| 6,793,481 | B2 | 9/2004 | Maruyama et al. |
| 6,860,732 | B2 | 3/2005 | Babin et al. |
| 7,137,807 | B2 | 11/2006 | Babin et al. |
| 7,189,071 | B2 | 3/2007 | Olaru |
| 7,306,454 | B2 | 12/2007 | Babin et al. |
| 7,462,032 | B2 | 12/2008 | Gaillard |
| 7,467,940 | B2 | 12/2008 | Bouti |
| 2003/0075563 | A1 | 4/2003 | Bazzo et al. |
| 2005/0255189 | A1 | 11/2005 | Manda et al. |
| 2006/0228442 | A1 | 10/2006 | Fischer et al. |
| 2007/0172537 | A1 | 7/2007 | Guenther |
| 2007/0178186 | A1 | 8/2007 | Goinski |
| 2008/0035297 | A1 | 2/2008 | Diaconu et al. |
| 2008/0050466 | A1 | 2/2008 | Gaillard |
| 2008/0086866 | A1 | 4/2008 | Dzafic et al. |
| 2008/0089969 | A1 | 4/2008 | Diaconu et al. |
| 2008/0089976 | A1 | 4/2008 | Dzafic et al. |
| 2008/0181983 | A1 | 7/2008 | Haque et al. |
| 2009/0017153 | A1 | 1/2009 | Condo |

FOREIGN PATENT DOCUMENTS

| | | |
|---|---|---|
| CA | 2 441 139 A1 | 3/2005 |
| DE | 1 929 363 | 12/1970 |
| DE | 32 11 342 A1 | 9/1983 |
| DE | 160541 * | 9/1983 |
| DE | 33 38 783 C1 | 3/1985 |
| DE | 43 24 027 A1 | 1/1995 |
| DE | 44 04 894 C1 | 1/1995 |
| DE | 101 50 419 A1 | 5/2003 |
| EP | 0 194 460 B1 | 9/1986 |
| EP | 0 274 005 B1 | 7/1988 |
| EP | 0 787 571 A1 | 8/1997 |
| EP | 0 885 707 A1 | 12/1998 |
| EP | 1 188 537 A2 | 3/2002 |
| EP | 1 188 537 A3 | 3/2002 |
| EP | 1 258 333 B1 | 11/2002 |
| EP | 1 188 537 A3 | 3/2003 |
| EP | 1 300 232 A1 | 4/2003 |
| FR | 2 877 870 A1 | 5/2006 |
| GB | 273 344 A | 6/1927 |
| JP | 4-30916 U | 3/1992 |
| JP | 5-237879 A | 9/1993 |
| JP | 2001-121585 A | 5/2001 |
| NL | 7900927 | 8/1980 |
| WO | WO-90/07627 A1 | 7/1990 |
| WO | WO-01/81066 A1 | 11/2001 |
| WO | WO-01/84022 A1 | 11/2001 |
| WO | WO-03/009986 A1 | 2/2003 |
| WO | WO-2006/042942 A1 | 4/2006 |
| WO | WO-2007/052868 A1 | 5/2007 |
| WO | WO-2007/143808 A1 | 12/2007 |

OTHER PUBLICATIONS

"Metal "O" Ring Sealing System for Runnerless Molds", *Incoe Brochure* Jan. 1995.

EP Search Report and Written Opinion for EP Application No. 10 004 534.3 Aug. 30, 2010.

W. Beitz, et al., "Dubble Taschenbuch fur den Maschinenbau" *Springer-Verlag*, Berlin, vol. 17 1990 , pp. K18-2.10.1.

* cited by examiner

INJECTION MOLDING RUNNER APPARATUS HAVING PRESSURE SEAL

FIELD OF THE INVENTION

The present invention relates to injection molding, and more particularly, to sealing against leakage of injection molding material.

BACKGROUND OF THE INVENTION

It is important to prevent leakage of injection molding material, be it plastic melt, molten metal, thermoset material, or some other material. The safety and integrity of injection molding operations depend on leak-proof or leak-resistant sealing of runners.

In many conventional designs, sealing at the interface between runner components, such as a hot runner manifold and the head of a connected nozzle, becomes weaker as the molding material pressure increases. Such a seal may eventually fail because of cyclic loading due to discrete injection molding "shots." It may fail for other reasons instead.

To maintain a good seal between runner components, the amount of preload on these components can be critical. In the case of hot-runner components, an air gap between these components is often required during cold conditions to achieve a good seal during higher, operating temperatures, after the components have undergone thermal expansion. If the true operating temperature is different from the designed operating temperature, the seal may not be effective. By the same token, as the system is heated to operating temperature, the air gap takes time to close.

High manufacturing tolerances may also be required to ensure a good seal.

Conventional solutions include using Belleville washers to create a preload between the flange surface and the manifold surface, using a sealing bushing of different material to create a seal due to differential heat expansion, using the heat expansion of the manifold and the flange to create a strong seal by limiting the air gap between the manifold plate and the top clamping plate, and using runner components that are threaded together.

U.S. Pat. No. 6,561,790 to Blais et al., which is incorporated by reference in its entirety herein, discloses a sealing member located between two manifolds, amongst other things. The sealing member concentrates sealing pressure adjacent the melt channels. An array of seal geometries are proposed, but suitable materials are not disclosed. Blais et al. suggest relying on thermal expansion and a spring means to achieve the seal.

US Published Patent App. No. 2003/0075563 in the name of Bazzo et al., which is incorporated by reference in its entirety herein, discloses a seal in the form of a substantially hemispherical annular member that ensures sealing even when an angle exists between nozzle and manifold. The hemispherical annular member acts as a ball-joint. Although it is disclosed that the sealing effect is further enhanced by the action of the pressure of the fluid plastic material applied against the inner wall of the substantially hemispherical annular member, the extolled hemispherical shape hinders the action of the pressure, which reduces the effectiveness of the seal.

BRIEF SUMMARY OF THE INVENTION

According to one aspect of the present injection, an injection molding runner apparatus includes an upstream runner component defining an upstream channel for flow of molding material, a downstream runner component coupled to the upstream runner component and defining a downstream channel for flow of molding material, and a wedge seal disposed in a converging gap defined by a first surface of the upstream runner component and a second surface of the downstream runner component. The wedge seal defines a seal channel connecting the upstream channel to the downstream channel. The wedge seal includes an inside surface defining the seal channel, a first, frusto-conical outer surface, and second outer surface. Pressure of molding material acting on the inside surface pushes the first, frusto-conical outer surface and the second surface of the wedge seal into sealing contact with the first and second surfaces of the upstream runner component and the downstream runner component defining the converging gap.

According to another aspect of the present injection, an injection molding runner apparatus includes an upstream runner component defining an upstream channel for flow of molding material, a downstream runner component coupled to the upstream runner component and defining a downstream channel for flow of molding material, and a wedge seal disposed in a converging gap defined by a first surface of the upstream runner component and a second surface of the downstream runner component. The wedge seal defines a seal channel connecting the upstream channel to the downstream channel. Pressure of molding material acting on an inside surface of the wedge seal defining the seal channel pushes the wedge seal into sealing contact with first and second surfaces of the upstream runner component and the downstream runner component defining the converging gap. The wedge seal comprises a material that has a lower stiffness than a material of the upstream runner component and the downstream runner component.

According to another aspect of the present injection, an injection molding runner apparatus includes an upstream runner component defining an upstream channel for flow of molding material, a downstream runner component coupled to the upstream runner component and defining a downstream channel for flow of molding material, and a seal in the shape of an annular ring. The seal is made of a material that has a lower stiffness than a material of the upstream runner component and the downstream runner component. The seal has a cylindrical inside surface defining a seal channel that connects the upstream channel to the downstream channel. The seal has a first, frusto-conical outer surface that is pushed into sealing contact with a first mating surface of one of the upstream runner component and the downstream runner component. The seal has second outer surface that is pushed into sealing contact with a second mating surface of the other of the upstream runner component and the downstream runner component. Such pushing is provided by pressurized molding material acting on the cylindrical inside surface of the seal.

BRIEF DESCRIPTION OF THE FIGURES

Embodiments of the present invention will now be described more fully with reference to the accompanying drawings in which.

DETAILED DESCRIPTION OF THE INVENTION

Figure 1:
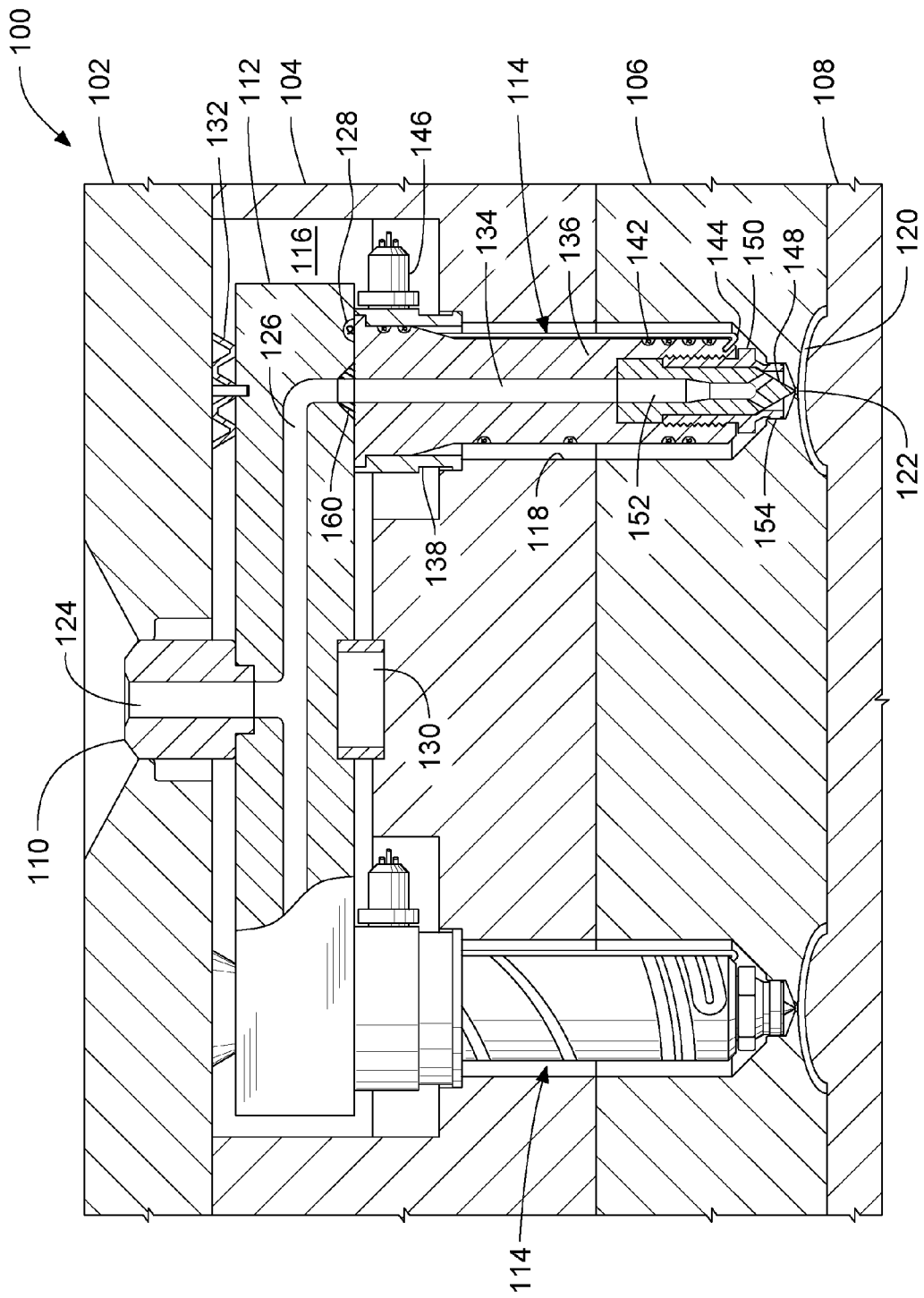
FIG. 1 is a cross-sectional view of an injection molding apparatus according to an embodiment of the present invention.

FIG. 1 shows an injection molding apparatus 100 according to an embodiment of the present invention. The features and aspects described for the other embodiments can be used accordingly with the present embodiment.

The injection molding apparatus includes a backing plate 102, a mold plate 104, a cavity plate 106, a core plate 108, an inlet component 110, a manifold 112, and a plurality of nozzles 114. The injection molding apparatus 100 may include any number of manifolds and nozzles, in any configuration. In this embodiment, one manifold is shown for simplicity. The injection molding apparatus 100 may include additional components, such as plates, alignment dowels, mold gate inserts, and cooling channels, among others.

The backing plate 102 partially defines an air space 116 and has a central opening that accommodates the inlet component 110. The mold plate 104 has a pocket that further defines the air space 116 for accommodating the manifold 112 and partially defines wells 118 for accommodating the nozzles 114. The cavity plate 106 further defines the wells 118, partially defines mold cavities 120, and defines mold gates 122 leading into the mold cavities 120. Bolts (not shown) are generally used to sandwich the plates together. There are many configurations of backing plate 102, mold plate 104, and cavity plate 106, and the shapes and sizes of these plates may be varied. The particular number of plates used is not significant, and more or fewer plates than shown may be used.

The core plate 108 further defines mold cavities 120, in which injection molded products are formed. The core plate 108 can be separated from the cavity plate 106 to eject such products. As with the cavity plate 106, the design of the core plate 108 may be varied.

The inlet component 110 includes an inlet channel 124 for receiving molding material (e.g., plastic melt) from a source, such as a plasticizing screw of an injection molding machine (not shown).

The manifold 112 (upstream runner component) defines a manifold channel 126 (upstream channel) and includes a manifold heater 128. The branching manifold channel 126 receives flowing molding material from the inlet channel 124 and distributes the molding material to the nozzles 114. The manifold heater 128 can be of any design, such as the embedded insulated resistance wire illustrated. The manifold 112 is thermally insulated by the air space 116 defined by the surrounding plates. The manifold 112 is offset from the mold plate 104 by the nozzles 114 and a locating ring 130, which also locates the manifold 112 in the correct position. The manifold 112 is offset from the backing plate 102 by pressure discs 132, which can elastically deform to absorb differential thermal expansion of the manifold 112 and nozzles 114 with respect to the plates 102, 104.

The nozzles 114 (downstream runner components) are coupled to the manifold 112 and seated in the wells 118 by the pressure discs 132. Air in the wells 118 serves to insulate the nozzles 114 from the surrounding plates. Each nozzle 114 is associated with a mold gate 122 and defines a nozzle channel 134 (downstream channel) in communication with the manifold channel 126 for delivering the flow of molding material to the mold gate 122. Each nozzle 114 includes a nozzle body 136, a nozzle flange 138 for supporting the nozzle body 136 in the well 118, a nozzle heater 142 embedded in the nozzle body 136, a thermocouple 144, a terminal end 146 for routing wiring of the heater 142 and thermocouple 144, a nozzle tip 148, and a tip retainer 150 for removably fastening the nozzle tip 148 to the nozzle body 136. The nozzle heater 142 can be of any design, such as the embedded insulated resistance wire illustrated. The nozzle tip 148 defines a tip channel 152 that forms part of the nozzle channel 134. The tip retainer 150 is threaded to the nozzle body 136 and includes a circumferential sealing surface 154 for sealing off the well 118 against backflow of molding material. The nozzles 114 in combination with the manifold 112 may be referred to as a hot runner, and generally, an injection molding runner apparatus.

In this embodiment, a seal 160 is provided in the manifold 112 to seal against leakage of molding material at the interface of the manifold 112 and an associated nozzle 114. A plurality of such seals 160 can be provided for the plurality of nozzles 114. The seals 160 are discussed in more detail below.

During operation, molding material is injected into the inlet component 110 and flows in a downstream direction through the heated manifold 112 and nozzles 114 to the mold gates 122 and into the mold cavities 120. When molding material in the mold cavities 120 solidifies, the core plate 108 is withdrawn from the cavity plate 106 and the finished products are ejected, thus completing one cycle of a series.

Figure 2:
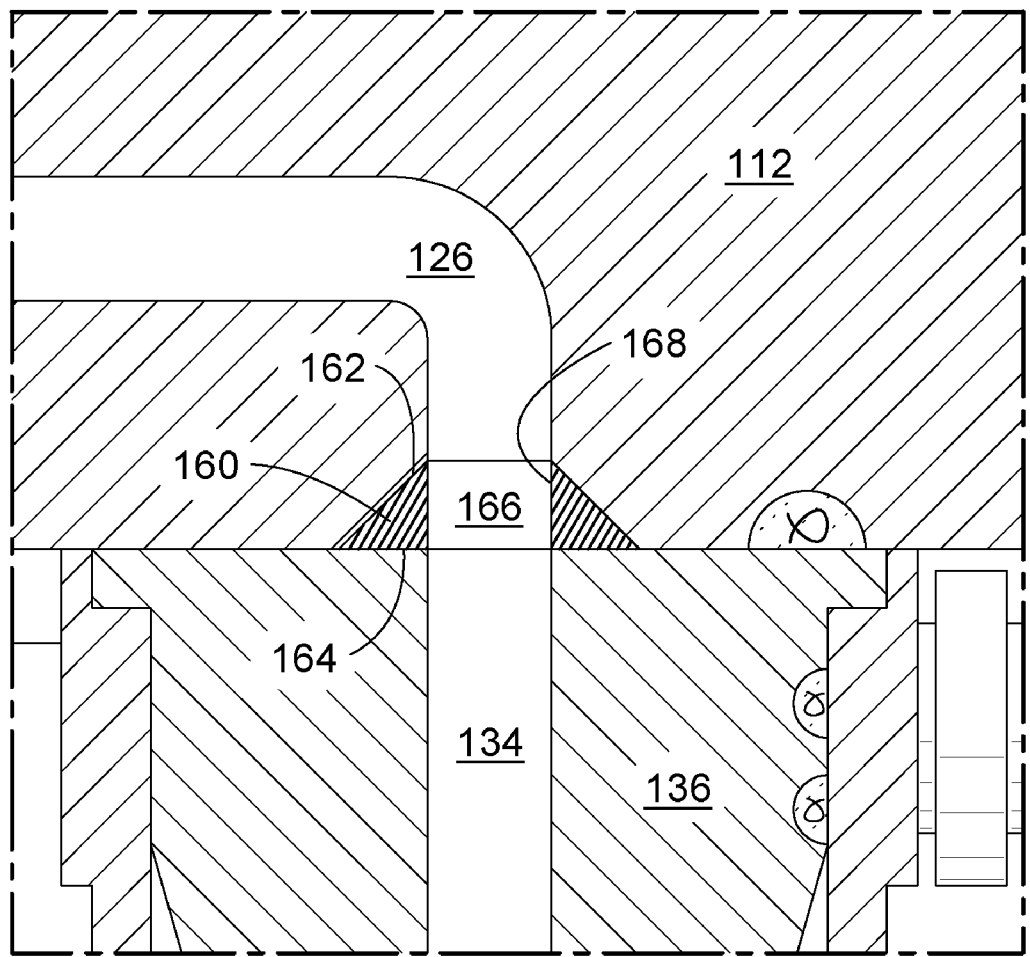
FIG. 2 is a cross-sectional close-up view of the injection molding apparatus in the vicinity of the seal.

FIG. 2 shows a close-up view of the injection molding apparatus 100 in the vicinity of the seal 160.

The seal 160 is an annular ring having a wedge-shaped profile or cross-section, such as the triangular cross-section depicted. The seal 160 is disposed in a like-shaped converging gap defined by the manifold 112 and the nozzle body 136. In this embodiment, the seal 160 is generally frusto-conical in shape. The outer, slanted surface of seal 160 is generally described as a frusto-conical surface 162. Seal 160 further includes an annular flat surface 164. Frusto-conical surface 164 and flat surface 164 are configured to be wedged into the converging gap. The frusto-conical surface 162 of the seal 160 mates with a frusto-conical surface formed in the manifold 112. The flat surface 164 of the seal 160 mates with a flat surface of the nozzle body 136. When viewed in cross-section, the frusto-conical surface 162 and the flat surface 164 appear as straight converging edges of the cross-section.

The seal 160 defines a seal channel 166 connecting the manifold channel 126 to the nozzle channel 134. The seal channel 166 is defined by a cylindrical inside surface 168, which is exposed to molding material.

During molding operations or when the molding material is otherwise pressurized, pressure of the molding material acts on the cylindrical inside surface 168 to push the frusto-conical surface 162 and the flat surface 164 into sealing contact with the mating surfaces of manifold 112 and nozzle body 136. That is, the pressure acts to wedge the seal 160 into the converging gap.

Figure 3:
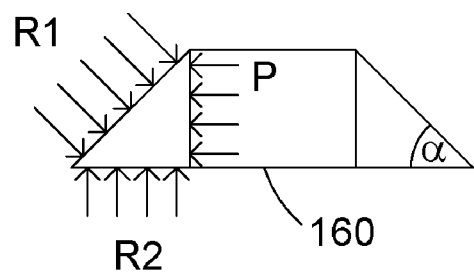
FIG. 3 is a free-body diagram of the seal.

FIG. 3 shows a free-body diagram of the seal 160. Pressure arrows are omitted from the right-hand side of the diagram for the sake of clarity.

Pressure of molding material, P, acts on the cylindrical inside surface 168 of the seal 160. A reaction pressure, R1, is exerted by the frusto-conical surface of the manifold 112 on the frusto-conical surface 162 of the seal 160. The reaction R1 is generally normal to the surface 162 and thus another reaction pressure, R2, is developed at the flat surface 164 to maintain equilibrium. Reactions R1 and R2 are sealing pressures and, generally speaking, the higher their values, the greater the sealing effect of the seal 160.

Since the pressure P balances itself across the entire cylindrical inside surface 168, the equation for P, R1, and R2 is statically indeterminate. Therefore, the stiffness of the seal 160 contributes to the values of the sealing reactions R1 and R2. All other things being equal, a high stiffness material results in low values for the sealing reactions R1 and R2, while a less stiff material results in higher values. Stiffness is based on geometric and material properties, and the wedge-shaped geometry of the seal 160 has been described. To further increase the sealing effect, the material of the seal 160 can be selected as a low stiffness or more flexible material, such as a material that has a lower stiffness than the surrounding components (i.e., the nozzle body 136 and manifold 112, which are typically made of steel). This is one reason why the seal 160 is a separate piece, and not an integral extension of the nozzle body 136 or manifold 112.

An appropriate material for seal 160 can be selected to achieve the pressure-assisted sealing described above. Copper, copper alloys, brass, these and other alloys mainly composed of copper, and other relatively soft metals are some examples of suitable materials for some applications. If non-metals are preferred, thermosets, such as silicone rubber, can be used. Polyimide, sold under the names VESPEL and PLAVIS, is also a material that is suitable in some applications. Selecting the specific material used should take into account molding conditions and compatibility with the surrounding materials, including the molding material itself. The preceding materials are exemplary and any material suitable for use in injection molding and conforming to the requirements described herein can be used.

As mentioned, the shape of the seal 160 aids deformation of the seal 160 into the converging gap. The shape of the seal 160 works in conjunction with the material of the seal 160 to provide a pressure-assisted sealing effect that increases as the pressure of the molding material increases. That is, as the pressure of the molding material, P, is increased, the sealing reactions R1 and R2 increase as well. An angle, $\alpha$, that defines the steepness of the frusto-conical shape can be designed, taking into account the selected material of the seal 160, to promote this positive wedging action. Angle $\alpha$ may be in the range of 20 to 60 degrees. In addition, it is not necessary for the surface 162 to be frusto-conical in shape, i.e., having single (circumferential) curvature. For example, a degree of double curvature approaching hemispherical can be used, as long as the expected reduction in sealing effect can be tolerated.

Figure 4:
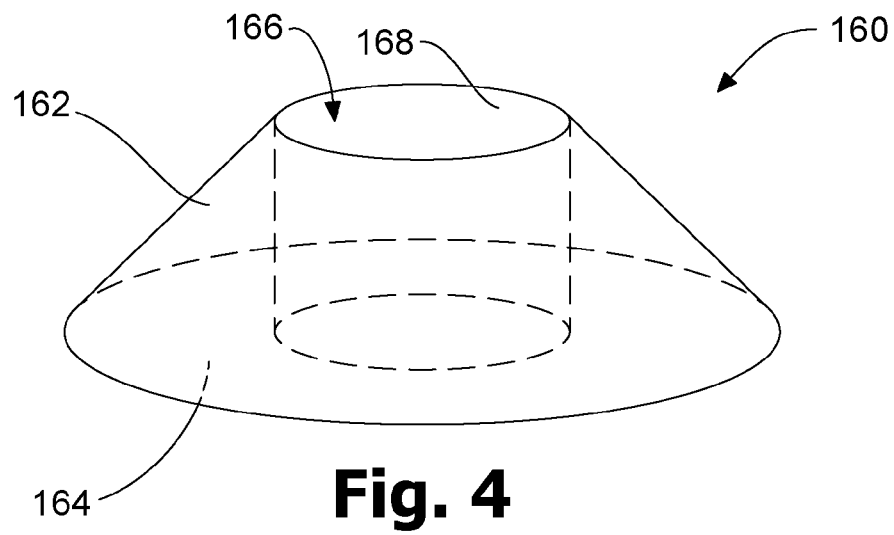
FIG. 4 is a hidden-line perspective view of the seal.

FIG. 4 shows a hidden-line perspective view of the seal 160. The surfaces 162, 164, 168, are indicated, as well as the through-channel 166.

FIGS. 5a-d show seals having different geometries according to additional embodiments of the present invention. The features and aspects described for other embodiments, including these embodiments, can be used accordingly with each of these embodiments.

An upstream runner component 202 and downstream runner component 204 are arranged to deliver molding material. The upstream runner component 202 and downstream runner component 204 are coupled together by, for example, mechanical structure (not shown) that holds the upstream runner component 202 and downstream runner component 204 firmly together.

Figure 5A:
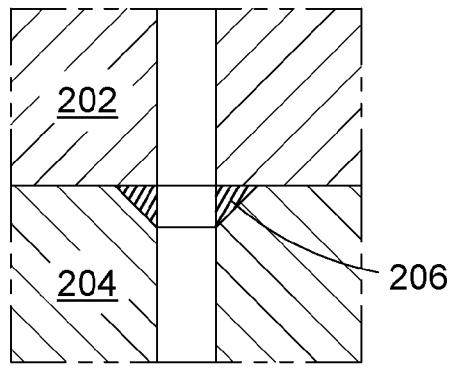
FIGS. 5a-d are cross-sectional views of seals according to other embodiments of the present invention.

FIG. 5a shows a seal 206 having a reversed orientation when compared to the seal 160. That is the seal 160 is located in a groove formed in the downstream runner component 204 (e.g., the nozzle). Any of the embodiments described herein can be flipped like this.

Figure 5B:
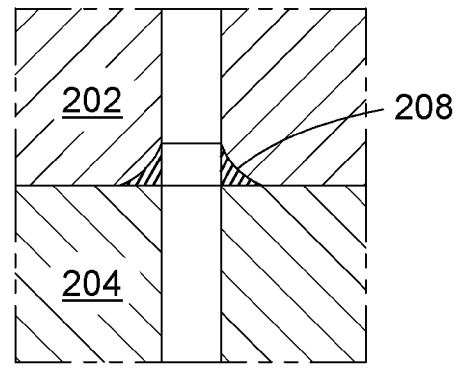

FIG. 5b shows a seal having a concave surface 208 in place of the frusto-conical surface described above. The concave surface 208 has double curvature.

Figure 5C:
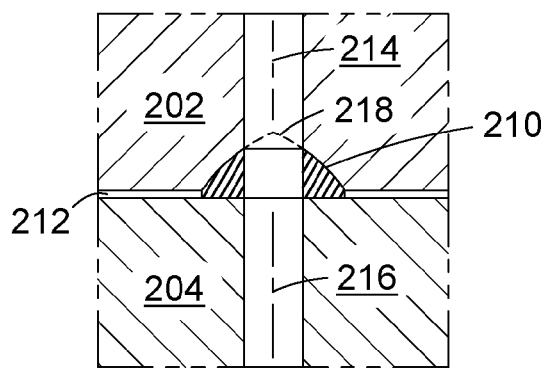

FIG. 5c shows a seal having a slightly convex surface 210 in place of the frusto-conical surface described above. The seal is also extended in length to provide a gap 212 between the downstream runner component 204 and upstream runner component 202. The convex surface 210 has double curvature but is not hemispherical, meaning that the seal does not act as a ball-joint if the axis 216 of the downstream runner component 204 becomes angularly misaligned from the axis 214 of the upstream runner component 202. The non-hemispherical nature of the seal is indicated by the mutually non-tangential extensions of the curves defining the slightly convex surfaces 210, as indicated at 218. Using curvature shallower than hemispherical increases the sealing effect.

Figure 5D:
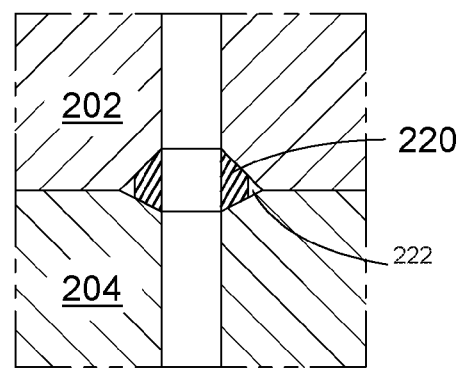

FIG. 5d shows a seal 220 having two frusto-conical surfaces mating with like surfaces in the upstream runner component 202 and downstream runner component 204. In this embodiment, both reactions R1 and R2 would have components directly resulting from mold pressure P. In addition, the seal 220 does not extend into the full depth of the converging gap, as indicated at 222.

In this embodiment, as well as others modified like this to leave some of the converging gap empty, the remaining gap 222 results in increased concentration of sealing reactions because the area of the seal 220 for the sealing reactions to act on is reduced. The sealing reaction pressures R1 and R2 generally increase as the remaining gap 222 size is increased, with the tradeoff being increased risk of failure of the seal 222 if the remaining gap 222 is made too big, i.e., if the area for reaction pressures R1 and R2 is made too small.

Figure 6:
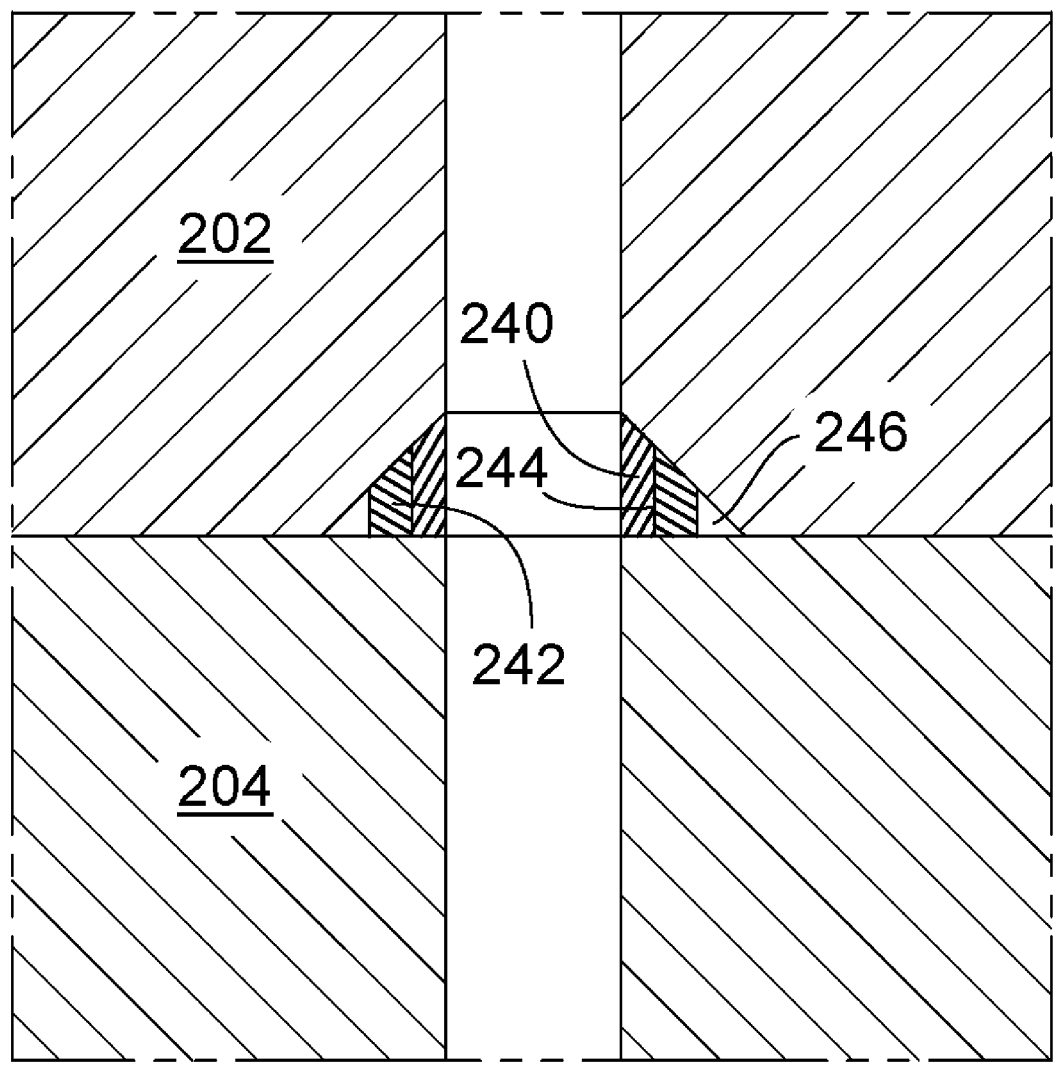
FIG. 6 is a cross-sectional view of a compound seal according to another embodiment of the present invention.

FIG. 6 shows a compound seal according to another embodiment of the present invention. The features and aspects described for the other embodiments can be used accordingly with the present embodiment.

As in the embodiments of FIGS. 5a-d, the upstream runner component 202 and downstream runner component 204 are coupled together by, for example, mechanical structure (not shown) that holds the upstream runner component 202 and downstream runner component 204 firmly together.

A first, inner wedge seal 240 is disposed in the converging gap, as described in the other embodiments. The shape of the first wedge seal 240 is trapezoidal.

A second, outer wedge seal 242 is disposed deeper in the converging gap and has an inside surface that abuts against an outside surface of the first wedge seal 240 as indicated at 244 The shape of the second wedge seal 242 is trapezoidal, resulting in part of the converging gap remaining empty, as indicated at 246. In another embodiment, the second wedge seal 242 is triangular or other shape that fills the remaining gap 246.

In this embodiment, the second wedge seal 242 has a stiffness that is higher than the stiffness of the first wedge seal 240. For example, the first wedge seal 240 may be made of copper alloy and the second wedge seal 242 may be made of harder copper alloy or steel. In another example, the first wedge seal 240 is made of polyimide and the second wedge seal 242 is made of copper. For increased sealing effect, the second wedge seal 242 can be made of a material that is less stiff than materials used for the upstream runner component 202 and downstream runner component 204. The first and second seals 240, 242 can be connected together (e.g., brazed, adhered, shrink fitted, etc), so that they can be installed and removed as a single piece; or, they may be separate pieces that can easily come apart. Depending on the expected tolerable level of leakage past the first seal 240, the second seal 242 may not be required to have material compatibility with the molding material.

The interplay of the first and second seals 240, 242 can be varied according to molding requirements. For example, the first seal 240 can be designed to push against the second seal 242 to transfer some of the sealing demand to the second seal 242 during normal operation. In another example, the second seal 242 is provided as an emergency backup with no expected sealing duty under normal molding conditions. The relative sizes, shapes, and materials of the first and second seals 240, 242 can be selected to achieve any number of variations in performance.

A finite element analysis (FEA) was carried out on a model similar to the configuration shown in FIG. 2. Sealing stresses (i.e., reaction pressures R1 and R2) were in the order of 100,000 psi (~689 MPa), which compared favorably to the approximately 22,000 psi (~152 MPa) resulting from a comparable conventional face-to-face seal. Maximum deformation at the seal under 35,000 psi (~2,400 bar) pressure of molding material was about 0.0019 inches (~0.048 mm). A subsequent, physical test yielded similar results.

Runner components that can be sealed with the seals described herein include nozzles, manifolds, inlet components, nozzle tips, pipes, tubes, and modular manifold segments, for example. The seal may be located at any interface of any two of the aforementioned runner components (e.g., inlet component to manifold interface, nozzle tip to nozzle body interface, main manifold to sub-manifold interface, etc). Each runner component may include or not include a heater. For example, when molding thermoplastic resins with a hot runner, one or more of the runner components will have a heater. On the other hand, when molding thermoset materials, runner components typically do not include heaters.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. An injection molding runner apparatus, comprising:
   an upstream runner component defining an upstream channel for flow of molding material;
   a downstream runner component coupled to the upstream runner component and defining a downstream channel for flow of molding material; and
   a first wedge seal disposed in a converging gap defined by a first surface of the upstream runner component and a second surface of the downstream runner component, an inside surface of the first wedge seal defining a seal channel connecting the upstream channel to the downstream channel, wherein pressure of molding material acting on the inside surface of the first wedge seal pushes the first wedge seal into sealing contact with the first surface and the second surface, wherein the first wedge seal comprises a material that has a lower stiffness than a material of the upstream runner component and the downstream runner component.

2. The injection molding runner apparatus of claim 1, wherein the first wedge seal is an annular ring having a cross-section that has at least two converging edges.

3. The injection molding runner apparatus of claim 2, wherein an angle between the two converging edges is in the range of 20 to 60 degrees.

4. The injection molding runner apparatus of claim 2, wherein the cross-section is triangular.

5. The injection molding runner apparatus of claim 1, wherein the first wedge seal has a surface of double curvature.

6. The injection molding runner apparatus of claim 5, wherein the first wedge seal is non-hemispherical.

7. The injection molding runner apparatus of claim 1, wherein the first wedge seal has a frusto-conical surface and a flat surface that are pushed into sealing contact with the first and second surfaces of the upstream runner component and the downstream runner component.

8. The injection molding runner apparatus of claim 7, wherein the upstream runner component is a manifold and the first surface is a frusto-conical surface to mate with the frusto-conical surface of the first wedge seal.

9. The injection molding runner apparatus of claim 1, further comprising a second wedge seal disposed in the converging gap and against an outside surface of the first wedge seal.

10. The injection molding runner apparatus of claim 9, wherein the second wedge seal has a stiffness that is higher than a stiffness of the first wedge seal.

11. The injection molding runner apparatus of claim 1, wherein the first wedge seal comprises copper.

12. The injection molding runner apparatus of claim 1, wherein the first wedge seal comprises thermoset material.

13. The injection molding runner apparatus of claim 1, wherein the first wedge seal comprises polyimide.

14. The injection molding runner apparatus of claim 1, wherein the upstream runner component and the downstream runner component comprise steel.

15. The injection molding runner apparatus of claim 1, wherein at least one of the upstream runner component and the downstream runner component includes a heater.

16. An injection molding runner apparatus, comprising:
   an upstream runner component defining an upstream channel for flow of molding material;
   a downstream runner component coupled to the upstream runner component and defining a downstream channel for flow of molding material; and
   a seal in the shape of an annular ring, the first seal made of material that has a lower stiffness than a material of the upstream runner component and the downstream runner component, the first seal having a cylindrical inside surface defining a seal channel that connects the upstream channel to the downstream channel, the first seal having a first, frusto-conical surface that is configured to be pushed into sealing contact with a first mating surface of one of the upstream runner component and the downstream runner component and second surface that is configured to be pushed into sealing contact with a second mating surface of the other of the upstream runner component and the downstream runner component, wherein first, frusto-conical surface and the second surface are configured to be pushed by pressurized molding material acting on the cylindrical inside surface.

17. The injection molding runner apparatus of claim 16, wherein the upstream runner component and the downstream runner component are made of steel and the seal comprises copper.

18. The injection molding runner apparatus of claim 16, wherein the upstream runner component is a heated manifold and the downstream runner component is a heated nozzle.

19. The injection molding runner apparatus of claim 16, further comprising a second seal disposed in the converging gap and against the first, frusto-conical surface of the first seal, the second seal made of a material that has a higher stiffness than the material of the first seal.

* * * * *

UNITED STATES PATENT AND TRADEMARK OFFICE
CERTIFICATE OF CORRECTION

| | | |
|---|---|---|
| PATENT NO. | : 7,874,833 B2 | |
| APPLICATION NO. | : 12/434684 | |
| DATED | : January 25, 2011 | |
| INVENTOR(S) | : Hitesh Kaushal | |

It is certified that error appears in the above-identified patent and that said Letters Patent is hereby corrected as shown below:

Column 8:
Claim 16, line 7, the first occurrence of "seal" should read --first seal--.

Signed and Sealed this
Seventh Day of June, 2011

David J. Kappos
*Director of the United States Patent and Trademark Office*